Aug. 7, 1923.
T. F. CULLEN
ASSEMBLING TOOL
Filed Jan. 23, 1919
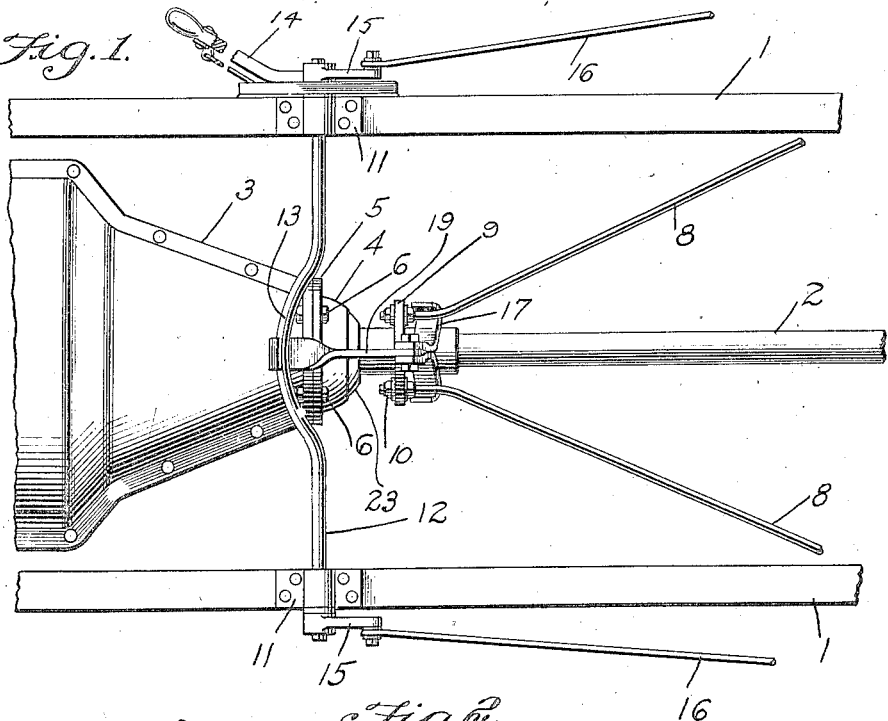
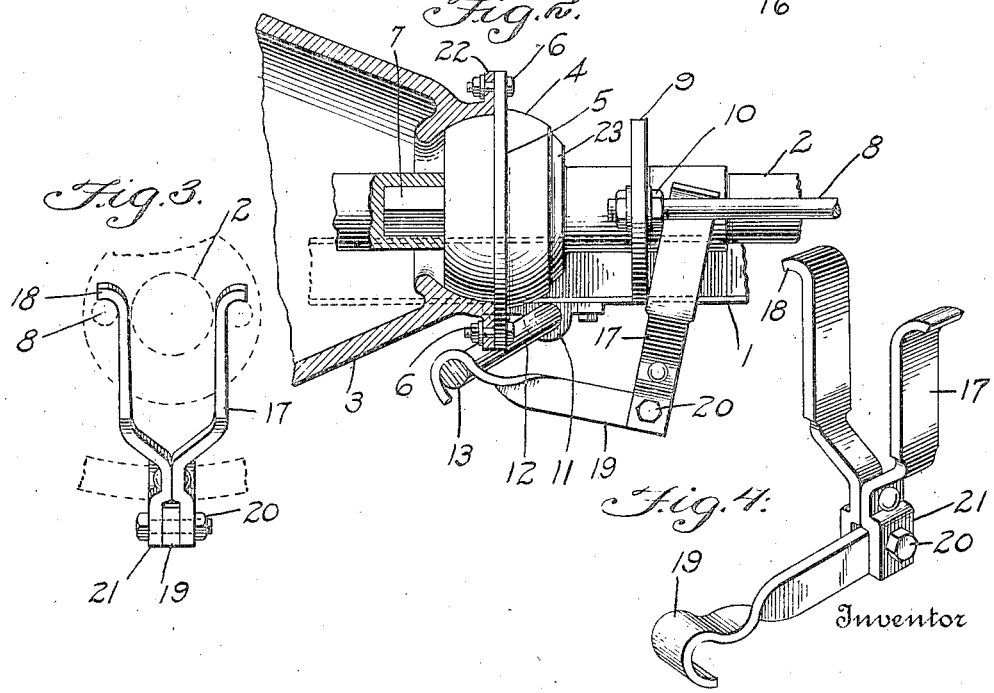

Patented Aug. 7, 1923.

1,464,129

UNITED STATES PATENT OFFICE.

THOMAS F. CULLEN, OF DAYTON, OHIO.

ASSEMBLING TOOL.

Application filed January 23, 1919. Serial No. 272,771.

(FILED UNDER THE ACT OF MARCH 3, 1883, 22 STAT. L., 625.)

*To all whom it may concern:*

Be it known that I, THOMAS F. CULLEN, a subject of the King of Great Britain, and a resident of Dayton, in the county of Montgomery and State of Ohio, have invented an Improvement in Assembling Tools, of which the following is a specification.

The invention described herein may be used by the Government, or any of its officers or employees in prosecution of work for the Government, or by any other person in the United States, without payment of any royalty thereon.

My invention relates to a new and useful improvement in assembling tools particularly to a tool used in assembling certain parts of automobiles; for example, of the Ford automobile.

In Ford cars of the usual type it is sometimes necessary to remove either the rear axle assembly or the motor for the purpose of making repairs or of replacing worn parts. The present practice in re-assembling the rear axle assembly with the motor necessitates the use of two men; one for holding the rear axle assembly tight against the rear of the motor and transmission and one to tighten the bolts that serve to clamp the rear axle assembly to the motor.

The object of my invention is to provide a tool whereby but one person may easily reassemble the parts named above.

Other objects and advantages will be apparent as the description of the device proceeds.

The tool and its use is exemplified in the accompanying drawings in which—

Fig. 1 is a bottom plan view of a portion of a Ford automobile showing the tool in use;

Fig. 2 is an enlarged longitudinal view, partly in section, of a portion of the transmission mechanism, and the front portion of the rear axle assembly with the assembling tool in position for holding the parts firmly together;

Fig. 3 is a view showing the relative position of the tool with respect to the rear radius rods and drive shaft tube; and Fig. 4 is a perspective view of the assembling tool.

Referring now more particularly to the drawings, in which like reference characters refer to corresponding parts throughout the several figures, The frame of the automobile is shown at 1; the rear drive shaft and its tube is indicated at 2; the transmission mechanism with its casing is shown at 3; the rear ball cap of the universal joint knuckle housing 23 is shown at 4. This housing ball cap has a flange 5 adapted to be securely bolted to the transmission casing by the aid of bolts 6. The square portion 7 of the rear drive shaft fits into a square socket in the rear of the transmission mechanism. The rear radius rods 8 are securely fastened to a flange 9 integral with the drive shaft tube 2 by means of nuts 10. Mounted in bearings 11, which are fastened to the frame 1, is the controller shaft 12 having an offset portion 13, which offset portion enables the controller shaft when rotated to clear the flange 5, as clearly shown in Fig. 2. This controller shaft is rotated by means of a hand lever 14. The hand lever 14 and the controller shaft 12 operate the rear wheel brakes by means of links 15 and rods 16.

The foregoing description is that of a standard Ford automobile and serves merely to make the use and application of my assembling tool readily understood. The assembling tool consists of a U-shaped portion 17 made up of two halves riveted together, and having slightly outturned edges 18. The hook 19 is securely fastened to the U shaped portion 17 by the bolt 20, passing through the extensions 21 integral with the halves of the U shaped portion 17. Should it be desired to hold the rear axle assembly firmly against the rear of the transmission mechanism while bolts 6 are applied and tightened, the assembling tool 17 is slipped under the drive shaft tube 2 and between it and the rear radius rods 8. The outwardly turned portions 18 rest upon the rear radius rods 8 as clearly shown in Fig. 3. The assembling tool is made of sufficiently springlike material so that the shank portions thereof may wedge into the space between the rear radius rods 8 and drive shaft tube 2. The hand lever 14 is now placed in its extreme forward position, so as to bring the offset portion 13 of the controller shaft 12 as far to the rear as possible. The hook 19 can then be readily placed in engagement with the offset portion 13. Upon pulling the hand lever 14 toward the rear the offset portion 13 is rotated toward the front, carrying with it the assembling tool 18. This tool at the first part of its movement tilts slightly, as shown in Fig. 2. On continued rearward movement of the hand lever 14, the assembling tool wedges in place as shown approximately in Fig. 2 and the entire rear axle assembly is pulled forward along with the assembling tool, and universal joint housing 4 brought tightly into the socket in the rear end of transmission housing 3, so that flange 5 can be brought tightly up against the corresponding flange 22 of the transmission housing 3. Of course, to allow such movement to take place, the squared portion 7 must be properly alined with its socket. The hand lever 14 is pulled rearward as far as it will go, and kept there by the aid of its pawl and ratchet. Thus the parts are held firmly in place while the bolts 6 are applied and tightened. To remove the tool, it is merely necessary to release the hand lever 14 and move it a sufficient distance forward so as to allow disengagement of hook 19 from offset portion 13.

Having thus described my invention, what I claim as new and desire to secure by Letters Patent is:

1. An assembling tool, embodying means to engage the radius rods of a rear assembly at their points of connection with the universal coupling, such means including a bifurcated member, the furcations adapted to pass between the sleeve of the universal coupling and the extremities of the radius rods, the free ends of the furcations being outwardly curved to engage said radius rods and means to connect said bifurcated member to the control shaft to effect alinement of the parts upon actuation of said shaft.

2. An assembling tool, embodying means to engage the radius rods of a rear assembly at their points of connection with the universal coupling, such means including a bifurcated member, the furcations adapted to pass between the sleeve of the universal coupling and the extremities of the radius rods and engage the latter and means to connect said bifurcated member to the control shaft to effect alinement of the parts on actuation of said shaft.

3. An assembling tool embodying means to engage a rear assembly of an automobile and additional means to inter-connect the first mentioned means with the control shaft to effect alinement of the parts upon actuation of said shaft

THOMAS F. CULLEN.